US012693183B2

(12) United States Patent
Willcox et al.

(10) Patent No.: US 12,693,183 B2
(45) Date of Patent: Jul. 28, 2026

(54) PRESSURE TRANSMITTER WITH MULTI-RANGE PRESSURE SENSOR

(71) Applicant: Rosemount Inc., Shakopee, MN (US)

(72) Inventors: Charles R. Willcox, Hopkins, MN (US); Nicholas E. Meyer, Victoria, MN (US); David J. Hillman, Prescott, WI (US); David M. Strei, Waconia, MN (US)

(73) Assignee: ROSEMOUNT INC., Shakopee, MN (US)

( * ) Notice: Subject to any disclaimer, the term of this patent is extended or adjusted under 35 U.S.C. 154(b) by 326 days.

(21) Appl. No.: 18/477,736

(22) Filed: Sep. 29, 2023

(65) Prior Publication Data

US 2025/0110001 A1 Apr. 3, 2025

(51) Int. Cl.
G01L 9/04 (2006.01)

(52) U.S. Cl.
CPC ..................................... G01L 9/04 (2013.01)

(58) Field of Classification Search
CPC . G01L 19/147; G01L 9/0072; G01L 19/0645; G01L 19/0084; G01L 13/025;
(Continued)

(56) References Cited

U.S. PATENT DOCUMENTS 4,414,853 A * 11/1983 Bryzek ................... G01D 3/036
374/173
4,800,758 A 1/1989 Knecht et al.
(Continued)

FOREIGN PATENT DOCUMENTS

EP 0697104 B1 * 2/2000 .............. G01B 7/18
JP 2024062554 A * 5/2024

OTHER PUBLICATIONS

International Search Report and Written Opinion for corresponding International Application No. PCT/US2024/046191, filed Sep. 11, 2024, dated Dec. 9, 2024, 13 pages.

*Primary Examiner* — Andre J Allen
(74) *Attorney, Agent, or Firm* — Westman, Champlin & Koehler, P.A.

(57) ABSTRACT

A pressure transmitter for sensing a pressure of a process fluid in an industrial process includes a pressure sensor body fluidically coupled to the process fluid configured to receive an applied pressure related to a pressure of the process fluid. The pressure sensor body has a high pressure region configured to deform in response to the applied pressure and a low pressure region configured to deform in response to the applied pressure. A high range resistor bridge circuit is mounted in the high pressure region having a powered node, a common node and an output node and has a resistance which changes in response to pressure applied to the high pressure region. A low range resistor bridge circuit is mounted in the low pressure region and has a powered node, a common node and an output node and having a resistance which changes in response to pressure applied to the low pressure region. A pressure output circuit couples to the output node of the high range resistor bridge and the output node of the low range resistor bridge and provides an output related to the applied pressure based upon a voltage difference between the output node of the high range resistor bridge and the output node of the low range resistor bridge.

19 Claims, 4 Drawing Sheets

(58) Field of Classification Search
CPC .............. G01L 19/0007; G01L 9/0042; G01L
19/0038; G01L 9/0073; G01L 9/0075;
G01L 9/0054; G01L 9/0055; G01L 19/04;
G01L 7/00; G01L 7/04; G01L 19/148;
G01L 19/14; G01L 19/143; G01L 17/00;
G01L 7/18; G01L 19/0092; G01L 15/00;
G01L 9/0051; G01L 7/041; G01L 9/12;
G01L 9/065; G01L 19/0618; G01L
9/0052; G01L 9/125; G01L 7/16; G01L
19/0609; G01L 19/003; G01L 9/007;
G01L 19/0627; G01L 19/0046; G01L
9/0022; G01L 9/06; G01L 19/0636; G01L
7/084; G01L 13/02; G01L 19/0023; G01L
19/142; G01L 7/043; G01L 19/08; G01L
9/0002; G01L 19/02; G01L 9/008; G01L
19/141; G01L 9/006; G01L 11/02; G01L
19/0672; G01L 23/10; G01L 23/18; G01L
19/0681; G01L 9/0077; G01L 19/12;
G01L 27/005; G01L 7/082; G01L 9/0044;
G01L 19/0015; G01L 19/0069; G01L
7/063; G01L 9/0001; G01L 19/146; G01L
21/12; G01L 27/002; G01L 27/007; G01L
9/16; G01L 11/00; G01L 19/00; G01L
9/0026; G01L 9/0089; G01L 9/045; G01L
9/14; G01L 19/0654; G01L 1/2281; G01L
11/025; G01L 13/026; G01L 11/008;
G01L 7/22; G01L 13/00; G01L 9/0047;
G01L 7/08; G01L 9/0076; G01L 9/0025;
G01L 9/0035; G01L 19/0061; G01L
9/0005; G01L 9/0041; G01L 9/0019;
G01L 9/08; G01L 9/10; G01L 21/00;
G01L 9/04; G01L 11/006; G01L 19/086;
G01L 9/00; G01L 9/0008; G01L 1/18;
G01L 11/004; G01L 19/069; G01L
9/0057; G01L 19/083; G01L 19/06; G01L
19/10; G01L 19/16; G01L 9/0016; G01L
13/023; G01L 7/048; G01L 9/0048; G01L
9/0027; G01L 9/0086; G01L 9/0079;
G01L 11/04; G01L 1/20; G01L 9/0091;
G01L 27/00; G01L 11/002; G01L 23/24;
G01L 7/182; G01L 1/02; G01L 19/0663;
G01L 7/166; G01L 23/22; G01L 9/0036;
G01L 9/0061; G01L 9/0039; G01L
23/125; G01L 19/145; G01L 9/0013;
G01L 21/04; G01L 9/0045; G01L 9/0092;
G01L 1/142; G01L 7/104; G01L 9/0033;
G01L 9/0083; G01L 9/0098; G01L
1/2293; G01L 7/24; G01L 9/02; G01L
21/22; G01L 9/0029; G01L 7/022; G01L
1/205; G01L 9/0064; G01L 23/08; G01L
5/14; G01L 13/06; G01L 23/16; G01L
7/088; G01L 7/163; G01L 9/0007; G01L
23/222; G01L 1/16; G01L 1/2287; G01L
9/0085; G01L 9/025; G01L 1/2212; G01L
21/14; G01L 9/0004; G01L 23/02; G01L
9/003; G01L 9/085; G01L 1/14; G01L
1/148; G01L 9/0058; G01L 9/105; G01L
7/02; G01L 7/061; G01L 9/002; G01L
1/2231; G01L 13/028; G01L 9/0095;
G01L 23/28; G01L 1/162; G01L 19/0076;
G01L 7/12; G01L 9/0038; G01L 9/0032;
G01L 21/10; G01L 7/024; G01L 19/149;
G01L 1/246; G01L 7/086; G01L 1/005;
G01L 5/228; G01L 7/06; G01L 1/2206;
G01L 7/102; G01L 13/021; G01L 27/02;
G01L 1/2262; G01L 1/24; G01L 1/26;
G01L 23/00; G01L 9/0094; G01L 19/144;
G01L 9/0082; G01L 1/125; G01L 9/0097;
G01L 1/2268; G01L 11/06; G01L 21/30;
G01L 21/34; G01L 23/221; G01L 7/187;
G01L 7/20; G01L 1/146; G01L 23/26;
G01L 7/068; G01L 1/144; G01L 1/225;
G01L 23/32; G01L 7/14; G01L 1/165;
G01L 23/12; G01L 1/241; G01L 13/04;
G01L 7/045; G01L 1/086; G01L 1/22;
G01L 7/108; G01L 9/18; G01L 1/127;
G01L 17/005; G01L 5/18; G01L 1/245;
G01L 21/32; G01L 1/183; G01L 1/2218;
G01L 9/0023; G01L 1/243; G01L 23/145;
G01L 5/0047; G01L 5/0076; G01L
9/0088; G01L 1/106; G01L 1/10; G01L
9/001; G01L 1/186; G01L 23/223; G01L
25/00; G01L 5/165; G01L 5/226; G01L
9/0017; G01L 1/044; G01L 3/245; G01L
9/005; G01L 1/08; G01L 21/16; G01L
3/1485; G01L 5/0038; G01L 5/162; G01L
5/225; G01L 7/026; G01L 7/065; G01L
9/0014; G01L 1/04; G01L 1/242; G01L
21/24; G01L 3/10; G01L 5/0004; G01L
5/0052; G01L 5/24; G01L 7/10; G01L
1/00; G01L 1/103; G01L 1/2275; G01L
1/247; G01L 21/02; G01L 21/26; G01L
23/225; G01L 3/102; G01L 3/105; G01L
5/223; G01L 7/028; G01L 9/0011; G01L
5/00; G01L 5/0028; G01L 5/243; G01L
1/083; G01L 1/12; G01L 21/36; G01L
23/04; G01L 23/14; G01L 23/30; G01L
3/103; G01L 5/0033; G01L 5/102; G01L
5/133; G01L 5/1627; G01L 5/166; G01L
7/185; G01L 1/255; G01L 21/08; G01L
5/0057; G01L 5/22; G01L 1/042; G01L
1/122; G01L 1/2225; G01L 1/2243; G01L
1/2256; G01L 1/248; G01L 2009/0067;
G01L 2009/0069; G01L 21/06; G01L
23/06; G01L 3/00; G01L 3/06; G01L
3/1478; G01L 3/1492; G01L 3/18; G01L
3/24; G01L 3/242; G01L 5/0061; G01L
5/08; G01L 5/10; G01L 5/101; G01L
5/108; G01L 5/16; G01L 5/161; G01L
5/167; G01L 5/28; G01L 1/046; G01L
2009/0066; G01L 2019/0053; G01L
23/085; G01L 23/20; G01L 5/0071; G01L
5/008; G01L 5/06; G01L 5/171; G01L
7/106
USPC ...................................................... 73/700–756
See application file for complete search history.

(56)                      References Cited

U.S. PATENT DOCUMENTS

| | | | | |
|---|---|---|---|---|
| 5,343,755 A | * | 9/1994 | Huss ......................... | G01B 7/18 |
| | | | | 73/766 |
| 5,485,753 A | * | 1/1996 | Burns ................... | G01L 9/0042 |
| | | | | 338/42 |
| 6,047,244 A | | 4/2000 | Rud, Jr. | |
| 6,293,154 B1 | | 9/2001 | Kurtz | |
| 7,178,403 B2 | | 2/2007 | Kurtz | |
| 8,132,464 B2 | | 3/2012 | Broden et al. | |
| 8,276,458 B2 | | 10/2012 | Hedtke | |
| 8,910,524 B2 | | 12/2014 | Bemis et al. | |
| 9,121,743 B2 | * | 9/2015 | Sofen ................... | G01F 23/806 |

(56) References Cited

U.S. PATENT DOCUMENTS

| | | | | |
|---|---|---|---|---|
| 9,804,048 | B2 * | 10/2017 | Zhang | ..................... G01L 13/00 |
| 10,317,297 | B2 * | 6/2019 | Van Der Wiel | ....... G01L 9/0055 |
| 10,635,064 | B2 | 4/2020 | Willcox | |
| 11,162,862 | B2 | 11/2021 | Landmann et al. | |
| 2002/0134163 | A1 | 9/2002 | Clifford | |
| 2018/0275001 | A1 * | 9/2018 | Tokuda | ..................... G01L 9/06 |

* cited by examiner

PRESSURE TRANSMITTER WITH MULTI-RANGE PRESSURE SENSOR

BACKGROUND

The present invention relates to pressure transmitters of the type used to measure pressure of process fluid in industrial processes. More specifically, the present invention relates to a pressure transmitter including a pressure sensor configured to sense pressure across multiple pressure ranges.

Process instruments are used to monitor process variables, such as pressure, temperature, flow and level, of process fluids used in industrial processes. For example, process transmitters are typically employed in industrial manufacturing facilities at multiple locations to monitor a variety of process variables along various production lines. Process transmitters include sensors that produce an electrical signal in response to physical changes in the process. For example, pressure transmitters include pressure transducers that produce an electrical signal as a function of the pressure of a process fluid, such as in water lines, chemical tanks or the like. Process transmitters also typically include transmitter electronics for receiving and processing the sensor signal so that the transmitter and process can be monitored remotely. Remotely monitored transmitters include electronics that transmit an electrical output over a control loop or network to a central monitoring location, such as a control room. Configured as such, the process can be regulated from the control room by including automated switches, valves, pumps and other similar components in the process control system and the control loop.

The process control industry has also developed sensors, such as pressure sensors, which provide a highly accurate output signal over different ranges. For example, one such sensor has an upper range limit of 4,000 psi and provides a high level of performance over a calibrated range of approximately 30 to 1 (or from approximately 150 psia to 4,000 psia). However, as the 4,000 psia sensor ranges down below 150 psia, the total error (as a percent of reading) in the output signal increases and may provide a performance level which is less than desired. Other sensors are used to measure pressure ranging from 0 to 200 psia and have been designed to provide a high level of performance over this entire operating range. It is possible to have multiple different pressure sensors in a pressure transmitter, with each sensor being designed to accurately measure pressure over different pressure ranges. However, this requires a significant change in the design of a typical transmitter configured for use with a single pressure sensor.

SUMMARY

A pressure transmitter for sensing a pressure of a process fluid in an industrial process includes a pressure sensor body fluidically coupled to the process fluid configured to receive an applied pressure related to a pressure of the process fluid. The pressure sensor body has a high pressure region configured to deform in response to the applied pressure and a low pressure region configured to deform in response to the applied pressure. A high range resistor bridge circuit is mounted in the high pressure region having a powered node, a common node and an output node and has a resistance which changes in response to pressure applied to the high pressure region. A low range resistor bridge circuit is mounted in the low pressure region and has a powered node, a common node and an output node and having a resistance which changes in response to pressure applied to the low pressure region. A pressure output circuit couples to the output node of the high range resistor bridge and the output node of the low range resistor bridge and provides an output related to the applied pressure based upon a voltage difference between the output node of the high range resistor bridge and the output node of the low range resistor bridge.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

As discussed in the Background Section, in order to measure pressures over more than one pressure range, a pressure transmitter can use different pressure sensors to measure process pressure over the differing pressure ranges. In another configuration, the pressure transmitter can include a single pressure sensor configuration capable of sensing pressures across multiple ranges. For example, a single sensor body can include multiple pressure sensing regions and an associated sensor, each of which are configured to sense pressures at different or overlapping pressure ranges. In such a configuration, electrical connections must be provided to the individual sensors for each of the pressure sensing regions so that measurement circuitry in the pressure transmitter can receive output signals from the sensors.

The present invention provides a multi-range pressure sensor in which individual pressure sensors are formed using resistor bridges. The resistance of these resistor bridges are arranged to change based upon pressure applied to pressure sensing regions of a pressure sensor body. Each of the resistor bridges includes a powered node and a common or ground node connected to an electrical power source. An output node from each of the resistor bridges connects to pressure output circuitry which detects a voltage difference between the output nodes. This voltage differential changes based upon the applied pressure and can be characterized to thereby accurately correlate the voltage difference to a particular applied pressure.

A multi range pressure sensor is provided which incorporates into one silicon die, both low-range and high-range pressure sensing regions, each with its own sensor configured to sense deformation. For example, piezoresistive strain gauges can be configured into two resistor bridge circuits arranged in push-pull configurations. Specifically, the two bridge circuits can have common voltage and grounds, but separate voltage outputs from each sensor. This necessitates two extra electrical connections to the pressure sensor and requires a new header design. In addition, the two outputs require modifications to existing measurement circuitry and software. The configuration set forth herein eliminates these changes by utilizing existing sensor board measurement electronics and software.

Figure 1:
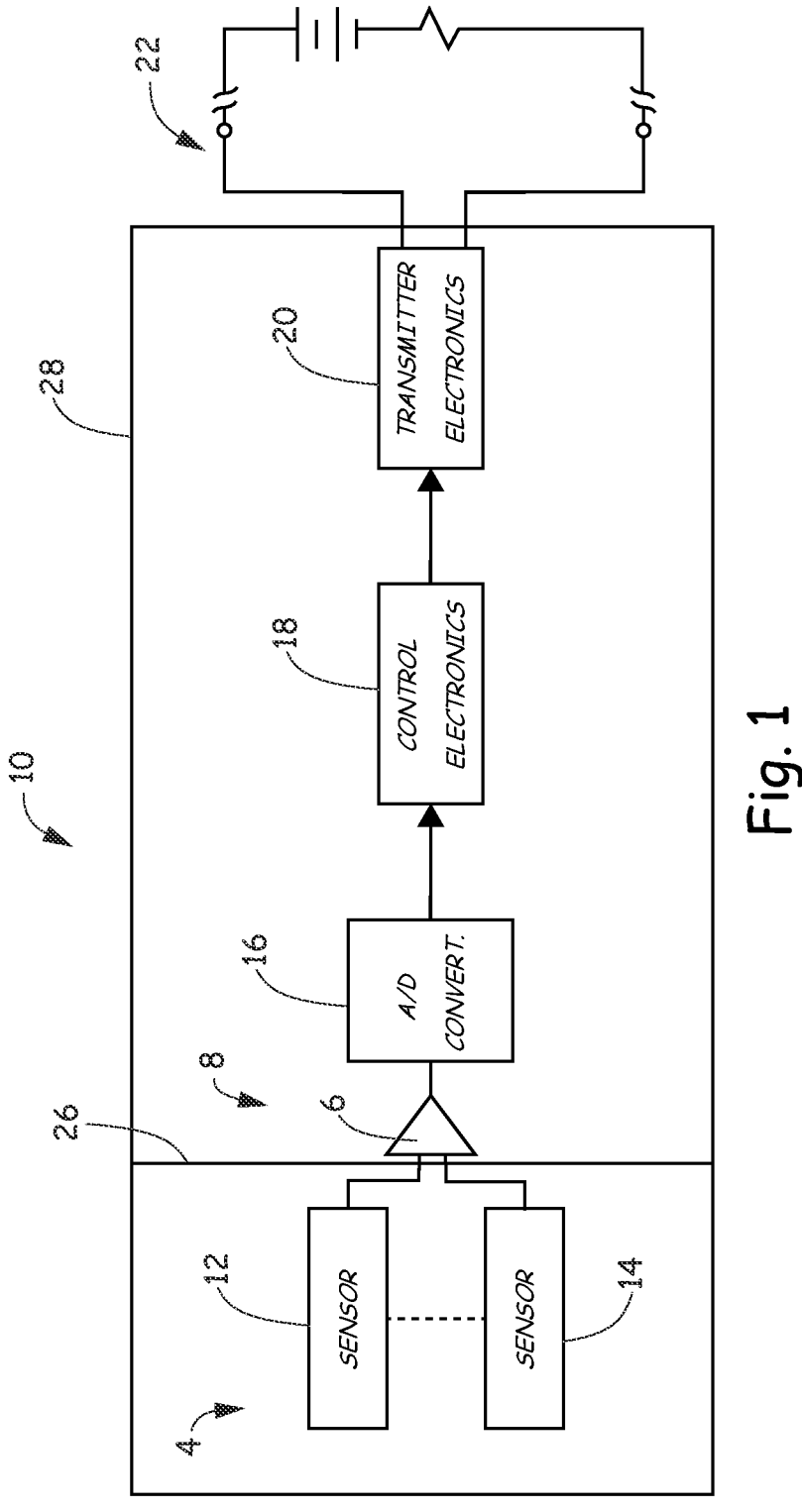
FIG. 1 is a simplified block diagram of a pressure transmitter including a multirange pressure sensor.

FIG. 1 is a block diagram of a multisensor pressure transmitter 10 in accordance with the present invention. Transmitter 10 includes a multirange pressure sensor 4 plurality of sensors 12 and 14. Outputs from sensors 12-14 are provided to a differential amplifier 6 having an output which is digitized by an optional analog-to-digital (A/D) converter 16. Transmitter 10 also includes control electronics 18 and transmitter electronics 20 which couple to a process control loop 22. Control electronics can comprise, for example, a microprocessor including a memory. Further, it is to be understood that the present invention can be implemented using analog or digital techniques. If using analog processing techniques, A/D converter 16 can be eliminated.

In the embodiment shown in FIG. 1, sensors 12 and 14 preferably provide output signals indicative of the sensed pressure to differential amplifier 6. A/D converter 16 converts the voltage difference signal to digital values and provides the digital values to the control electronics 18. The control electronics 18 typically includes signal conditioning and correction circuitry which corrects the sensor signals for various errors and non-linearities (such as induced by changes in static pressure, differential pressure and temperature). The control electronics 18 then provides one output signal, based on two or more input signals received from sensors 12 and 14, to transmitter electronics 20. The transmitter electronics 20 provides an output signal, based on the pressure sensed, to loop 22. In one embodiment, loop 22 is a 4-20 mA current loop modeled by a series connected battery and resistive load. Transmitter 10 may be powered wholly by current loop 22. Transmitter electronics 20 provides the output signal on loop 22 according to standardized two-wire 4-20 mA current loop transmitter communications protocols. Loop 22 may be a fully analog loop, where no digital communication is present, and the current is representative of sensed pressure. Other standardized transmitter communication protocols may be used. Digital signals may also be output on the 4-20 mA current loop, as in a HART® implementation of loop 22. Alternatively, transmitter 10 may output a digital signal as in FIELDBUS, and all information output by transmitter 10 (arid present on loop 22) is represented by a digital signal. Loop 22 may also be implemented as a wireless loop in accordance with WirelessHART® (IEC 62591) or ISA 100.11a (IEC 62734), or another wireless communication protocol, such as WiFi, LoRa, Sigfox, BLE, or any other suitable protocol including a custom communication protocol.

In the embodiment shown in FIG. 1, sensor 12 is calibrated for a lower pressure range of operation and provides a highly accurate output signal indicative of pressure in the lower range. Sensor 14 is calibrated for a higher pressure range of operation and provides a highly accurate output signal indicative of pressure in the higher range.

FIG. 1 also illustrates a header 26 in a housing 28 of transmitter 10. Header 26 provides a sealed barrier which is typically capable of withstanding high pressures. Header 26 prevents process fluid from entering the portion of the housing 28 which contains the transmitter electronics should a process fluid leak develop at sensor 12,14. However, header 26 must also allow electrical connections to be made between the transmitter circuitry and the sensors 12.14.

Figure 2:
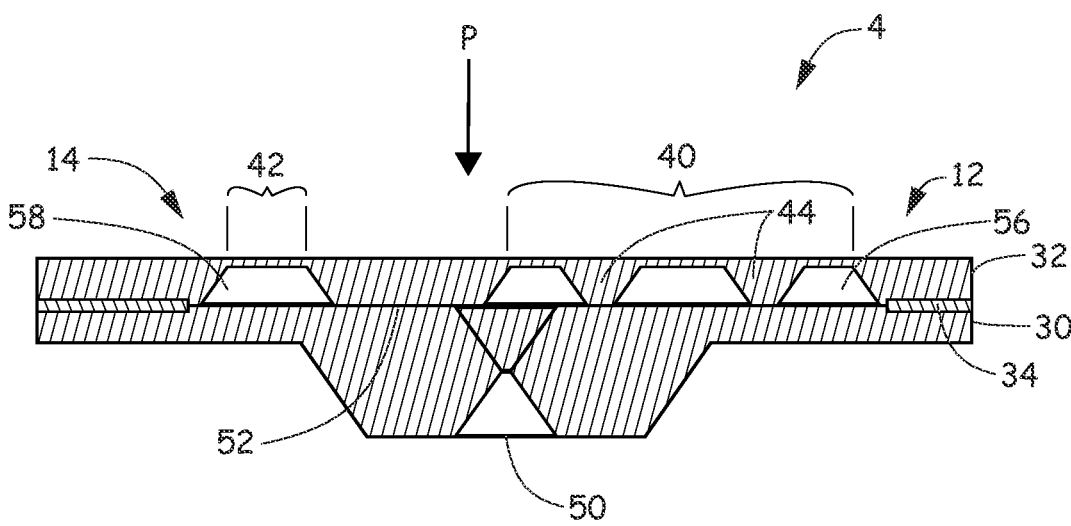
FIG. 2 is a cross-sectional view of one example of a dual range pressure sensor.

In one embodiment, sensor 4 is implemented as a dual-range inline strain gage pressure sensors as illustrated in FIG. 2. This sensor configuration incorporates into one silicon die, both low-range and high-range pressure sensors, each with their own piezoresistive strain gauges configured into push-pull bridge configurations. Sensor 4 is fabricated from a lower silicon substrate 30 bonded to an upper silicon substrate 32 by a glass frit 34. Substrate 12 includes a low pressure diaphragm 40 and a high pressure diaphragm 42. A gauge vent hole 50 is provided in lower substrate 30 to allow coupling a gauge pressure to the cavities 56,58 within sensor 4 formed by diagrams 40 and 42. A channel 52 is formed in the glass frit 34 to connect cavities 56 and 58.

Low pressure diaphragm 40 is larger than high pressure diaphragm 42 and deflects more readily in response to pressure P applied at a low pressure range. Overpressure stops 44 on low pressure diaphragm 40 prevent the low pressure diaphragm 40 from deforming beyond its operating range in response to an applied high pressure, which could result in failure of the low pressure diaphragm 40. Piezoresistive strain gauges are carried on diaphragms 40 and 42 and have electrical resistances which change in response to the deformation of diaphragms 40 and 42 to applied pressure P.

Figure 3:
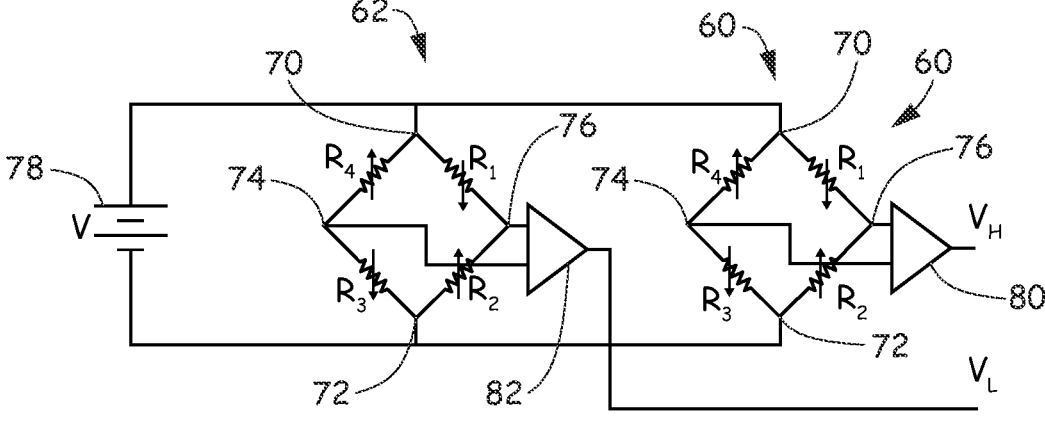
FIG. 3 is an electrical schematic diagram of two resistor bridges in a dual range pressure sensor coupled to two differential amplifiers.

To sense deformation, the piezoresistive strain gauges can be arranged as a high pressure range Wheatstone bridge 60 and a low pressure range Wheatstone bridge 62 as illustrated in FIG. 3. Each bridge 60,62 includes four resistive strain gauges R1, R2, R3 and R4. These provide powered nodes 70 between resistors R1 and R2, common nodes 72 between resistors R2 and R3, first output nodes 74 between resistors R3 and R4 and second output nodes 76 between resistors R1 and R2. A voltage source 78 provides a voltage between the powered nodes 70 and the common nodes 72. Differential amplifier 80 provides an output signal VH related to the voltage difference between nodes 74 and 76 of high pressure range bridge 60 and differential amplifier 82 provides an output signal VL related to the voltage difference between nodes 74 and 76 of high pressure range bridge 62.

The bridges 60 and 62 are configured with a push-pull topology whereby under applied pressure, two of the resistors go into tension and two go into compression as represented by arrows. These two states are represented by up and down arrows. In such a push-pull arrangement, the voltage differential is doubled from one side of the bridge increasing in voltage while the other side decreases. The net effect is a doubling of the differential voltage.

In FIG. 3, bridges 60,62 have common voltage and grounds, but separate voltage outputs from each sensor. This necessitates two additional electrical connections through header 26 in comparison to a single pressure sensor which uses only a single bridge circuit. Therefore, this configuration requires a new header design. In addition, the two outputs VH and VL require changes to measurement circuitry as well as software modifications to accept these two outputs. Thus, this arrangement requires that the header body contain two extra pins to accommodate the second output. In addition, the two outputs must be handled separately with electronics including either two ASICs to read the two outputs or a multiplexer to multiplex the two outputs to a single ASIC. This requires a significant redesign of the transmitter circuitry and software

5

Figure 4:
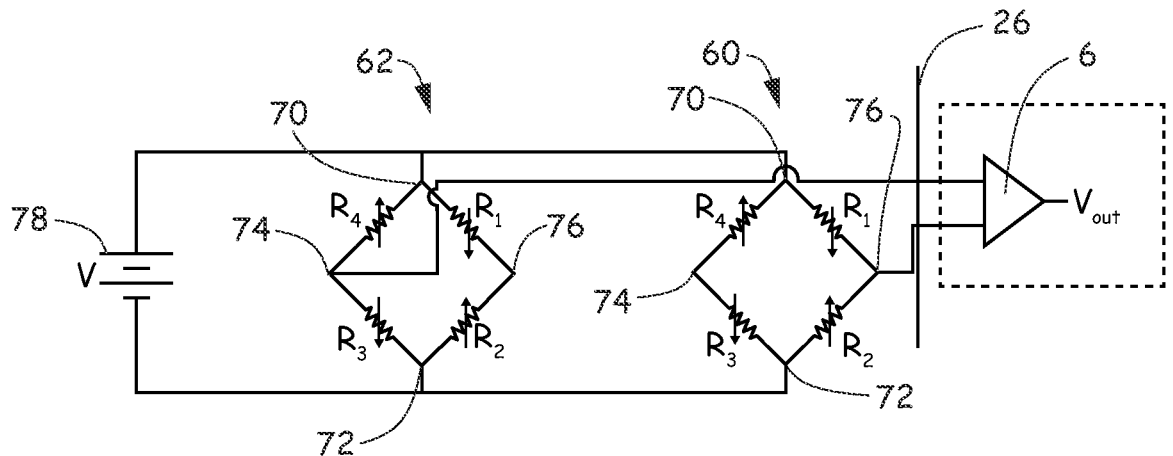
FIG. 4 is an electrical schematic diagram of two resistor bridges in a dual range pressure sensor coupled to a single differential amplifier.

The dual-range pressure sensor 4 of FIG. 2 incorporates two sensors into a single die and provides a cost-effective technique for offering a device having both low and high pressure ranges. To address these issues discussed in connection with FIG. 3, FIG. 4 illustrates another configuration. In the configuration shown in FIG. 4, only one half of the bridge 60,62 output from each sensor 12,14 is used, with one using a push side of the bridge 60, while the other uses the pull side of the other sensor's bridge 62. As shown in FIG. 4, this configuration does not require an additional electrical connection through header 26 and further can be used with a single differential amplifier 6 which is also shown in FIG. 1.

Figure 5:
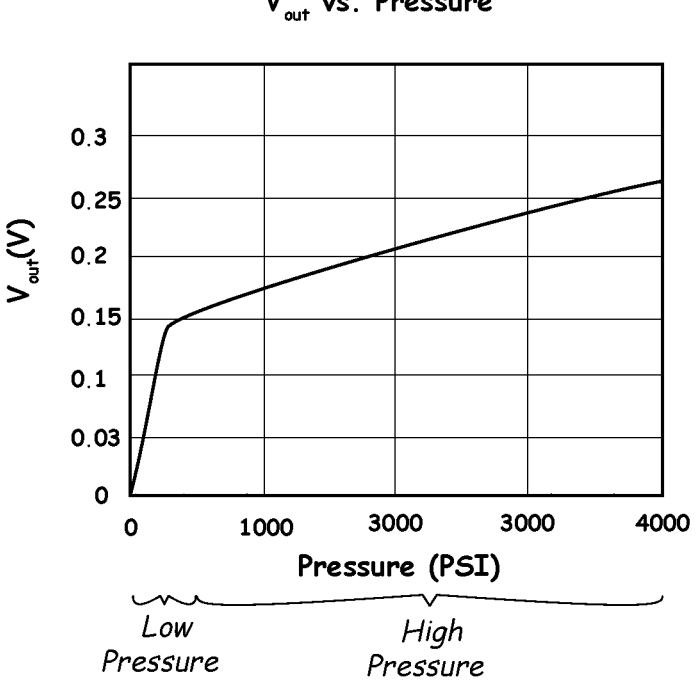
FIG. 5 is a graph of $V_{out}$ versus pressure for the different amplifier of FIG. 4

When configured as shown in FIG. 4, the output $V_{OUT}$ from differential amplifier 6 behaves as shown in FIG. 5 in response to a changing pressure. In this configuration, the voltage output is essentially reduced by 50 percent for the low and high range sensors. Hence, the sensors are effectively ranged down 2:1. If the sensors provide a sufficiently large voltage swing, this can be considered an acceptable trade-off given the simplicity of the implementation.

As illustrated in FIG. 5, the output is very sensitive to pressure change over the low pressure range. However, once the overpressure stops 44 (shown in FIG. 2) prevent further deflection of diaphragm 40, the output becomes less sensitive to pressure changes over the high pressure range. This is because high pressure diaphragm 42 has less area and deflects less in response to changes in applied pressure. The output can be calibrated to applied pressure using any appropriate technique. The calibration can also include temperature of the pressure sensor to account for changes in how the diaphragms 40,42 deflect in response to applied pressure at different temperatures. In one example calibration techniques, a very high order polynomial fit is implemented in control electronics 18 and used to adapt to the sharp discontinuity between the low and high-pressure transition region shown in FIG. 5. In another configuration, a polynomial with weighted fitting whereby the weights are low in the low and high regions where the linearity is good and higher weights used around the knee region. In another example, a piecewise polynomial fit is used which is comprised of three separate polynomials, each independently targeting the low pressure range, the high pressure range, and the transition between the two ranges.

Figure 6:
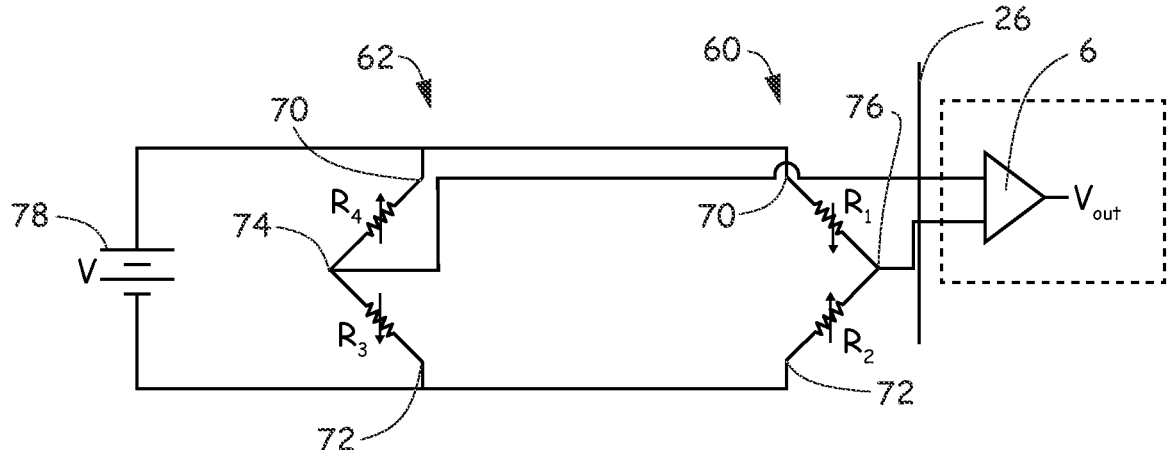
FIG. 6 is an electrical schematic diagram of two resistor bridges, each formed using only two resistors, in a dual range pressure sensor coupled to a differential amplifier.

FIG. 6 shows another example embodiment. In the configuration of FIG. 6, two resistors in each bridge circuit 60,62 are removed. The differential voltage provided in the configuration of FIG. 6 is the same as the differential voltage provided in the configuration of FIG. 4. However, the current used in the configuration of FIG. 6 is half of that used in the configuration of FIG. 4 by eliminating a resistor pair on each bridge 60,62. This can be useful in systems where the current is limited. However, note that the voltage output $V_{OUT}$ will have the discontinuity shown in FIG. 5. Further, it is possible to use a resistor bridge to sense temperature. In such a configuration, the current through bridges 60,62 can be measured, for example by voltage source 78, and correlated to temperature by control electronics 18. However, the resistance provided by the bridge configuration shown in FIG. 4 would present an uncalibrated current-temperature profile to control electronics 18 in comparison to a sensor having a single bridge circuit. The current-temperature profile provided by the configuration shown in FIG. 6, however, is similar to the profile provided by a single bridge sensor and would be properly calibrated to temperature.

Embodiments of the present disclosure are described more fully hereinafter with reference to the accompanying drawings. Elements that are identified using the same or similar reference characters refer to the same or similar elements. Some elements may not be shown in each of the figures in order to simplify the illustrations.

The various embodiments of the present disclosure may be embodied in many different forms and should not be construed as limited to the specific embodiments set forth herein. Rather, these embodiments are provided so that this disclosure will be thorough and complete, and will fully convey the scope of the present disclosure to those skilled in the art. Although the present invention has been described with reference to preferred embodiments, workers skilled in the art will recognize that changes may be made in form and detail without departing from the spirit and scope of the invention. Although two sensing ranges are illustrated, the invention can be implemented with more than two sensing regions and resistor bridge circuits. However, each additional bridge will result in an overall reduction in the sensitivity of the pressure sensor. As used herein, pressure output circuitry includes a differential amplifier, analog to digital converter, and/or transmitter electrics. Although the configuration shown in FIG. 6 does not show traditional bridge circuits, are used herein, the configurations of circuits 60,62 are considered to be bridge circuits.

What is claimed is:

1. A pressure transmitter for sensing a pressure of a process fluid in an industrial process, comprising:
   a pressure sensor body fluidically coupled to the process fluid configured to receive an applied pressure related to a pressure of the process fluid, the pressure sensor body having a high pressure region forming a first cavity configured to deform in response to the applied pressure and a low pressure region forming a second cavity configured to deform in response to the applied pressure;
   a high range resistor bridge circuit mounted in the high pressure region having a powered node, a common node and an output node and having a resistance which changes in response to pressure applied to the high pressure region;
   a low range resistor bridge circuit mounted in the low pressure region having a powered node, a common node and an output node and having a resistance which changes in response to pressure applied to the low pressure region; and
   a pressure output circuit coupled to the output node of the high range resistor bridge and the output node of the low range resistor bridge configured to provide an output related to the applied pressure based upon a voltage difference between the output node of the high range resistor bridge and the output node of the low range resistor bridge.

2. The pressure transmitter of claim 1 wherein the high range resistor bridge and the low range resistor bridge have a supply voltage and a ground.

3. The pressure transmitter of claim 1 wherein the output of one side of the low range resistor bridge is measured.

4. The pressure transmitter of claim 1 wherein the output of one side of the high range resistor bridge is measured.

5. The pressure transmitter of claim 1 wherein the pressure sensor output is calibrated over temperature and pressure.

6. The pressure transmitter of claim 1 wherein the pressure sensor output is calibrated using a high-order polynomial.

7. The pressure transmitter of claim 1 wherein the pressure sensor output is calibrated using a weighted polynomial.

8. The pressure transmitter of claim 1 wherein the pressure sensor output is calibrated using a piecewise fit of a plurality of polynomials.

9. The pressure transmitter of claim 1 wherein the high and low pressure regions comprise diaphragms which deflect in response to the applied pressure and change a volume of respective first and second cavities.

10. The pressure transmitter of claim 1 including over-pressure stops associated with the low pressure diaphragm.

11. The pressure transmitter of claim 1 including a passageway between the high pressure region first cavity and the low pressure region second cavity.

12. The pressure transmitter of claim 1, wherein the sensor body comprises two substrates bonded together.

13. The pressure transmitter of claim 12 wherein the two substrates are bonded with glass frit.

14. The pressure transmitter of claim 1 wherein the pressure sensor body comprises silicon.

15. The pressure transmitter of claim 1 wherein the pressure output circuit includes a differential amplifier connected to the output node of the high range resistor bridge and the output node of the low range resistor bridge.

16. The pressure transmitter of claim 1 including a header which separates the pressure sensor body from the pressure output circuitry.

17. The pressure transmitter of claim 16 wherein the output node of the high range resistor bridge and the output node of the low range resistor bridge are electrically connected to the pressure output circuitry through the header.

18. The pressure transmitter of claim 1 wherein the high range resistor bridge circuit is formed by four resistor elements and includes a second output node and the low range resistor bridge circuit is formed by four resistor elements and includes a second output node.

19. The pressure transmitter of claim 1 wherein the pressure output circuitry is further configured to measure temperature based upon current flowing through the high range resistor bridge circuit and the low range resistor bridge circuit.

* * * * *